United States Patent [19]

Schrom et al.

[11] Patent Number: 4,711,493
[45] Date of Patent: Dec. 8, 1987

[54] MOUNTING OR LOCKING ASSEMBLY, ESPECIALLY FOR USE WITH PIVOTABLE MOTOR VEHICLE SEATS

[75] Inventors: Ralf-H. Schrom, Rüsselsheim; Horst Baltes, Florsheim, both of Fed. Rep. of Germany

[73] Assignee: General Motors Corporation, Detroit, Mich.

[21] Appl. No.: 831,179

[22] Filed: Feb. 20, 1986

[30] Foreign Application Priority Data

Apr. 17, 1985 [DE] Fed. Rep. of Germany ....... 3513807

[51] Int. Cl.$^4$ .............................................. B60N 1/02
[52] U.S. Cl. ...................................... 297/379; 24/664; 296/65 R
[58] Field of Search ............ 297/378, 379; 296/65 R; 292/DIG. 38, DIG. 41, 198, 216; 24/664, 665, 669

[56] References Cited

U.S. PATENT DOCUMENTS

| | | | |
|---|---|---|---|
| 3,410,600 | 11/1968 | Thorpe | 297/379 X |
| 3,767,244 | 10/1973 | Plaw | 292/DIG. 38 X |
| 3,881,758 | 5/1975 | Gross | 292/DIG. 38 X |
| 3,985,380 | 10/1976 | Raivio | 292/DIG. 38 X |
| 4,035,877 | 7/1977 | Brownson et al. | 24/664 X |
| 4,203,621 | 5/1980 | Noel et al. | 292/216 |
| 4,235,462 | 11/1980 | Torii et al. | 292/216 |
| 4,408,373 | 10/1983 | Mishowicz | 24/664 |
| 4,475,763 | 10/1984 | Hamatani et al. | 297/378 X |

Primary Examiner—Kenneth J. Dorner
Assistant Examiner—Peter R. Brown
Attorney, Agent, or Firm—William A. Schuetz

[57] ABSTRACT

A mounting or locking device, the latter especially for use with foldable, lockable seat backs for motor vehicle rear seat assemblies, includes a mounting or locking housing for accommodating a bolt or other latching element to be retained therein, an arresting element which is mounted for movement on the mounting or locking housing, and which is actuable against a spring force in the direction of the "release position", and an actuating element acting on the arresting element. The mounting or locking housing and the arresting element are combined into one integral, unitary structure which is made of plastics, with the arresting element being formed onto the mounting or locking housing through a bracket. The bracket also serves as a pivot bearing and a resilient element for the arresting elment.

A mounting or locking assembly of this type is characterized by the sparsity of parts required for its manufacture. It is simple in design, economical to manufacture and easy to assemble.

2 Claims, 9 Drawing Figures

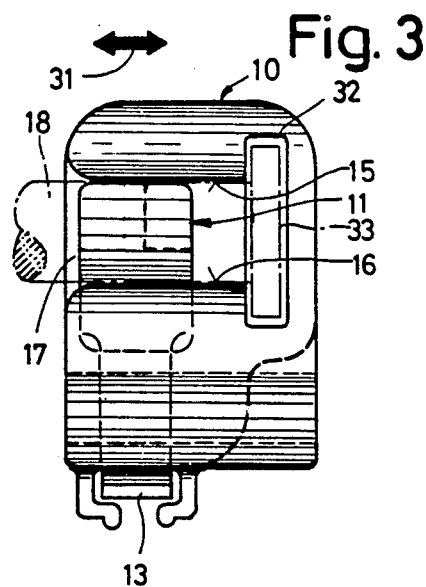
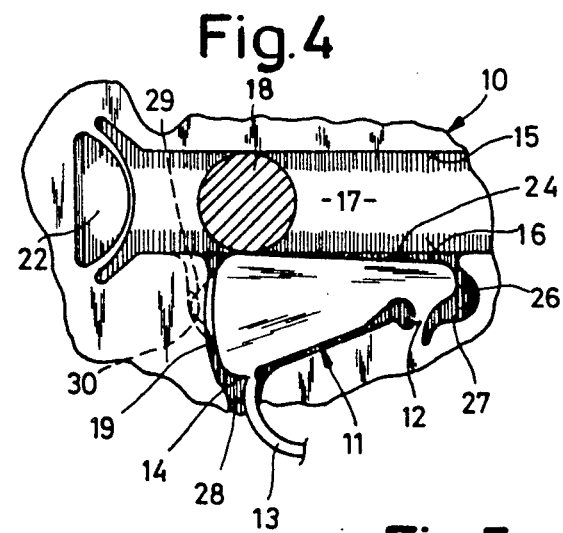
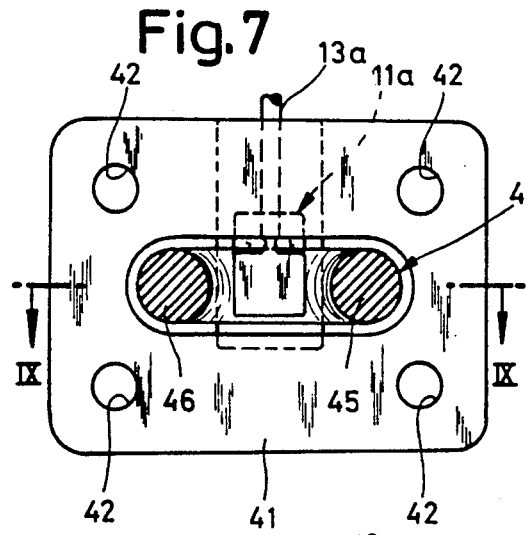
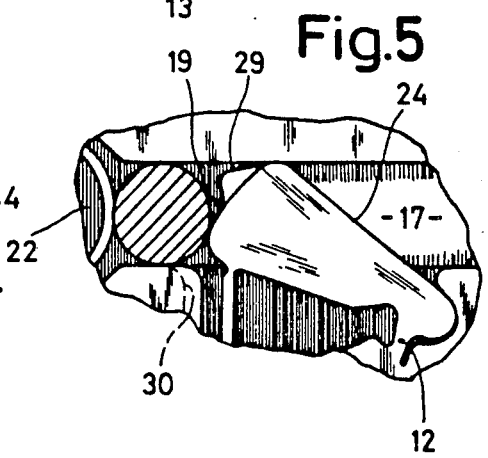
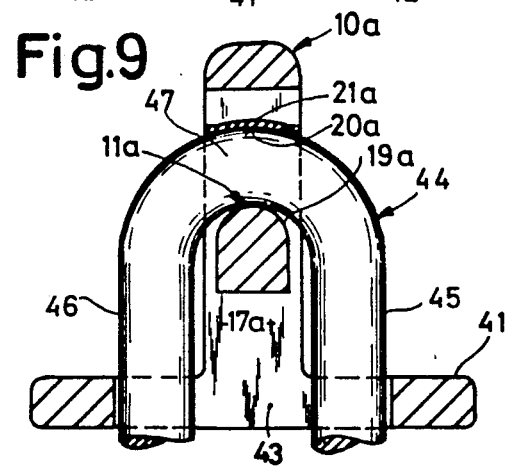
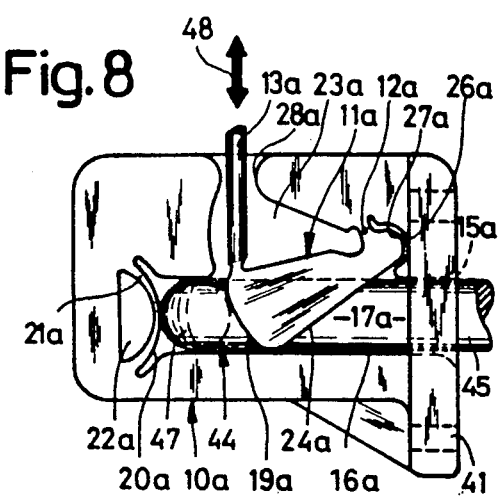

MOUNTING OR LOCKING ASSEMBLY, ESPECIALLY FOR USE WITH PIVOTABLE MOTOR VEHICLE SEATS

The invention relates to a mounting or locking device, the latter device being adapted especially for locking a pivotable seat back of a rear seat used in motor vehicles, including a mounting or locking housing for receiving and retaining a bolt or other locking element, an arresting member which is mounted for movement on the mounting or locking housing and which is actuable against the bias of a spring in the direction of the "release position", and an actuating element for actuating the arresting element.

Various devices have heretofore been provided which are designed to permit easy removal of the parts that are mounted therein. These arrangements are usually of the type comprised of several parts, or of a type in which elastic sockets are employed which are adapted to effect a force-locking connection.

Devices of this type are typically used in automobiles, and are particularly suitable for use in the releasable locking mechanism for pivotable rear seat back rests. Seat back locking devices of this type, as disclosed for instance in DE-PS No. 31 40 002, are usually comprised of a plurality of parts to be assembled, e.g., locking housing, arresting member, latch bolt, springs and miscellaneous actuating elements. However, because of the various individual parts and elements employed in these prior-art assemblies, tooling and preassembly costs are relatively high.

It is the object of the present invention to provide a device of the type described above which is comprised of relatively few individual components and which is easy to manufacture.

In accordance with the invention, this object is achieved in that the mounting or locking housing and the arresting member are unitized so as to form a one-piece component made of plastics, with the arresting element being integrally formed on said mounting or locking housing through a bracket, and in that the bracket also performs the function of a pivot bearing and a spring element for the arresting member. The one-piece component, which incorporates the mounting or locking housing and the arresting member, inclusive the bracket, may be an injection molded piece which is made from polyamide or POM.

As indicated in the foregoing, the mounting or locking device is simple in design and inexpensive in manufacture, and the number of individual parts are reduced to two, i.e., the mounting or locking housing with the arresting member and the actuating element on the one hand, and the bolt or other element to be locked and retained therein on the other hand.

The mounting or locking device according to the invention is adapted for a variety of uses. It is particularly suitable as a releasable locking means for a pivotable rear seat back rest used in motor vehicles. A preferred form of the invention is characterized in that onto the locking housing there is integrally formed, in a direction vertically or substantially vertically thereof, a fastening plate which serves as a means by which the locking housing is secured, as for instance by threaded bolts, to the seat back of the rear seat assembly, and in that the fastening plate is provided with an opening for the arresting member, said opening being in spatial communication with the guide channel for the element to be locked, and in that the element to be locked is secured to the vehicle body and is arranged, with respect to the locking housing, in such a manner that, upon pivoting movement of the seat back of the rear seat, it will engage with the locking housing or will disengage therefrom when the latch member is in the release position.

Other advantageous arrangements which encompass the basic concept of the invention will be apparent from the sub-claims.

Several exemplary embodiments are illustrated in the drawings and described in the following specifications.

In the drawings:

FIG. 3 is a side elevational view of the same embodiment, looking in the direction of arrow B in FIG. 2;

FIG. 4 is a fragmentary, front elevational view of the assembly according to FIGS. 1 to 3;

FIG. 5 is another fragmentary view of the assembly according to FIGS. 2 and 4;

FIG. 7 is a front elevational view of an arrangement for a locking assembly of the seat back according to FIG. 6, but at an enlarged scale as compared to FIG. 6 and looking in the direction of vehicle travel;

FIG. 8 is a side elevational view of the locking assembly according to FIG. 7; and FIG. 9 is a cross sectional view taken along line 9—9 of FIG. 7.

Figure 1:
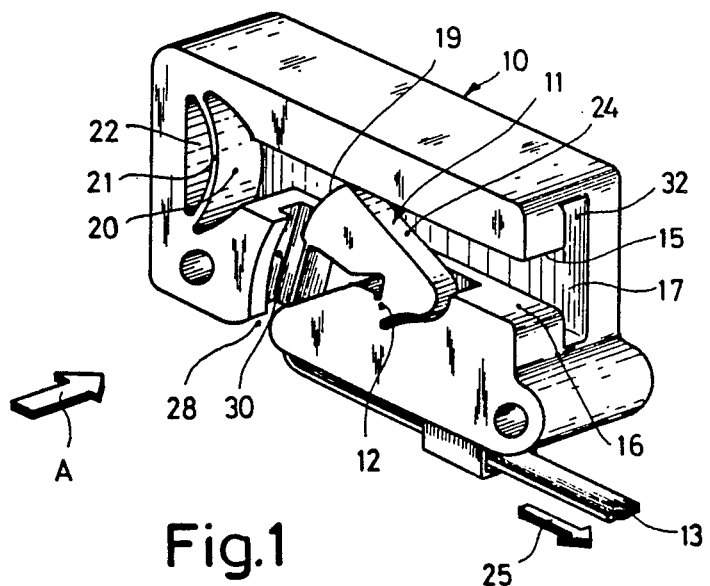
FIG. 1 is a perspective view of an exemplary embodiment of a mounting or locking assembly.

In accordance with FIGS. 1 to 5, numeral 10 designates a mounting and locking housing, of the locking device and numeral 11 an arresting or latch member which is integrally formed on the mounting or locking housing 10 by way of a bracket or web hinge 12. The bracket 12 also serves as a pivot bearing and as a resilient element for the latch member 11. An actuating or release element 13 is formed integrally on the arresting element 11 at 14. Thus, the above-mentioned parts 10–14 are combined into a unitary or one piece component which is, preferably, an injection molded part that can be fabricated in one single operation. This results in a considerable saving in manufacturing and assembly costs.

Figure 2:
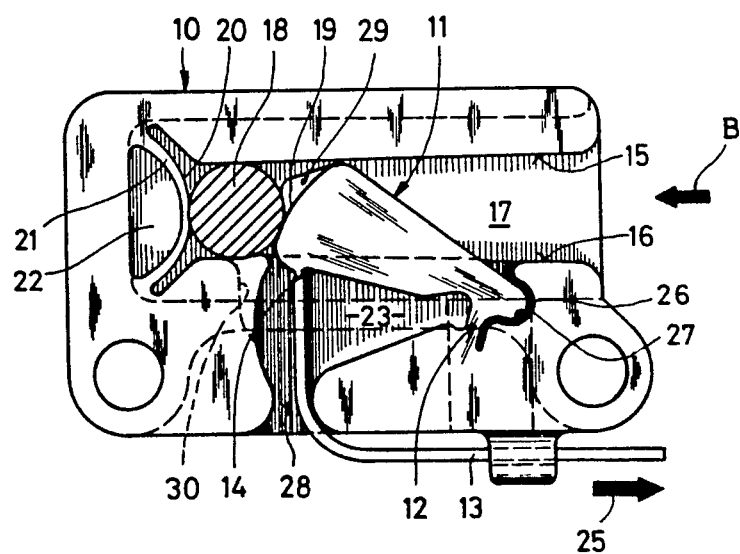
FIG. 2 is a front elevational view of the embodiment according to FIG. 1, looking in the direction of arrow A in FIG. 1.

As is also apparent from FIGS. 1 to 5, the mounting and locking housing 10 is also provided with a guide channel or slot means 17 defined or formed by two parallel extending guide surfaces 15, 16, said guide channel 17 being adapted to receive a locking element to be retained and/or locked in the mounting and locking housing 10. In the embodiment according to FIGS. 1 to 5, such an element to be locked is in the form of a bolt and is designated by the numeral 18. As is apparent from the drawings, especially FIGS. 1 and 2, the arresting element 11 is subjected to the resilient force exerted by the web hinge or bracket 12 and is thereby pivotally urged into a first portion in which it is disposed within the guide channel 17. This first position, in which the arresting element 11 is pivotally urged inside the guide channel 17, and which is illustrated, for instance, in FIG. 2, is the locking position. When in the locking position, the bolt 18 is retained between a slightly arcuate end face surface 19 of the arresting member 11 and a resilient engagement surface 20 formed on the closed end of the guide channel 17. As apparent from FIGS. 1, 2 and 4, the engagement surface 20 is formed by leaf spring element 21 or the like which has an arcuate configuration and is convexly curved in the direction towards the bolt 18. In back of the leaf spring element 21 there is a hollow space 22 which enables resilient movement of the leaf spring member 21.

The mounting and locking housing 10 also has an open space 23 whose contours correspond to that of the arresting element 11. As apparent from FIG. 4, this open space 23 is provided to accommodate the arresting element 11 when it is in the unlatching position. It is also apparent from FIG. 4 that when the arresting element 11 is in its unlatching position, one of its lateral surfaces, designated by the numeral 24, is aligned with and forms part of the guide surface 16 of the guide channel 17. Thus, in the unlatched position, the arresting element 11 facilitates insertion of the bolt 18 into the guide channel 17. In order to move the arresting element 11 into the unlatching position illustrated in FIG. 4, a pulling force has to be exerted in the direction of arrow 25 on the actuating element or cable 13, and the spring bias of the web hinge or bracket 12 has to be overcome. As soon as the bolt 18 to be locked has assumed its final position, as indicated in FIG. 2, the control cable 13 can be released, and the latch member 11 will then be caused by the spring force of the web hinge or bracket 12 to return into its locking position, as illustrated in FIG. 2 in which its curved end 19 engages the locking bolt 18 and retains the latter between this surface and the leaf spring 20.

In order to be able to absorb the forces acting on the bolt 18 and transmitted by it to the arresting member 11 when the locking assembly is in the locking position, the arresting element 11 has an engagement surface 26 at the end facing away from the bolt 18 which is adapted to cooperate with a complementary counter engagement surface 27 provided on the mounting or locking housing 10 and the arrangement is such that any forces imposed by the bolt 18 onto the arresting element 11 are transmitted by the arresting element 11 directly to the mounting or locking housing 10. The curvature of the engagement surface 26 on the arresting element 11 is convex and that of the counter engagement surface 27 on the mounting or locking housing 10 is concave.

As apparent from the drawings, especially FIGS. 2 and 4, the actuating cable 13, which is secured laterally on the latch member 11 at 14, is emerging out of the mounting or locking housing 10 through a slot 28 which is in spatial communication with the opening 23.

The latching bolt 18 may be rotatably or non-rotatably secured to, preferably, the back rest, if the locking device is used for locking the seat back of a motor vehicle rear seat assembly, and in this instance, the locking assembly, parts 10 to 14, is to be secured to a body component or vehicle body structure (not shown). If the bolt 18 is of the rotatable type, i.e., if the seat back is equipped with a pivotable and removable arm rest, the surface 19 of the arresting element 11 cooperating with the bolt 18 to be locked is provided, as apparent from FIGS. 2, 4 and 5, with a protrusion 29 which, when the arresting element 11 is in the unlatched position (FIG. 4), cooperates with a corresponding undercut 30 provided on the mounting or locking housing 10. This arrangement will prevent inadvertent unlocking of the seat back in the event a load of the arm rest is acting on the arresting element 11 and, in combination therewith, the bolt 18 is turned in clockwise direction which, on account of the frictional engagement between the bolt 18 and the arresting element 11, may cause the arresting element 11 to be urged into the direction of the unlatching position. The undercut 29 prevents such unwanted movement of the arresting element 11 and also provides that the arresting element 11, when in its unlatched position, is fixed into position in the transverse direction.

As is apparent from FIG. 3, the bolt 18 to be locked, is also fixed in the transverse direction, dual arrow 31. For this purpose, the mounting or locking housing 10 is provided with a slot or slot portion 32 which cooperates or is in communication with the guide channel 17, i.e., the guide surfaces 15, 16, so as to form a T-guide slot arrangement. As a counterpart to the slot 32, the bolt 18 is provided with an offset, enlarged end 33 which cooperates with and is adapted to engage into the slot 32.

Figure 6:
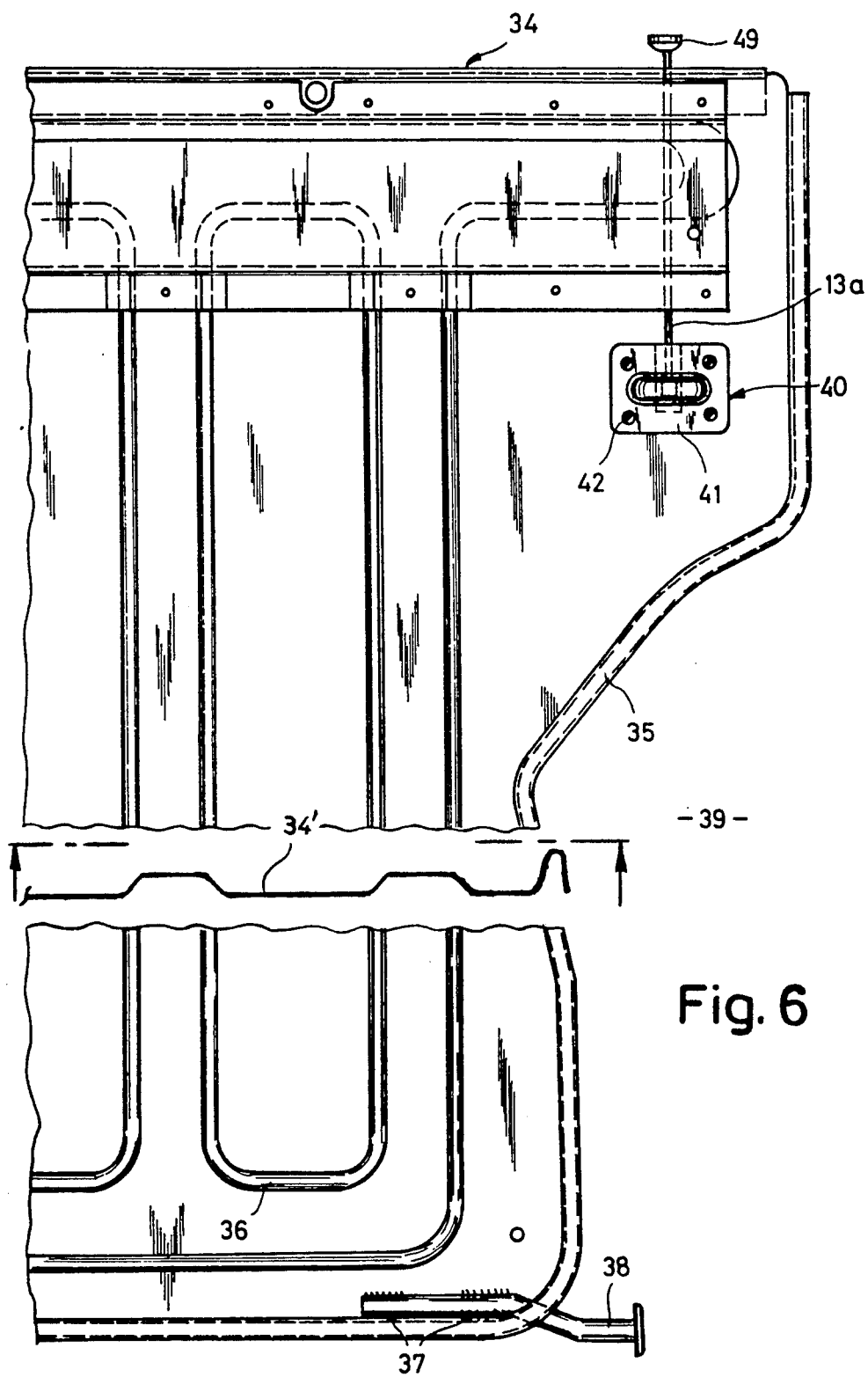
FIG. 6 is a fragmentary view of the left portion of a rear seat seat back for motor vehicles (without seat back covering and upholstery), looking from a point in front of the vehicle, i.e., in the direction opposite vehicle travel.

FIGS. 7 to 9 illustrate a modification of the locking arrangement according to FIGS. 1 to 5. This arrangement is especially suitable for use in a pivotable seat back of a rear seat assembly used in passenger cars, and its application in a seat back is illustrated in FIG. 6. In this figure, numeral 34 designates a stamped sheet metal panel used for the seat back. This panel 34 has a peripheral, continuous channel 35 to which, as is typical, the cover of the seat back upholstery is attached. The usual reinforcing ribs which form a meander-like pattern on the seat back sheet metal panel 34, are designated by the numeral 34, and the numeral 34' designates the cross-sectional pattern of said panel 34. A journal pin 38, which is welded at 37 to the outer lower edge of the sheet metal panel 34, serves as a means by which the seat back is pivotally connected to the vehicle body, i.e., to the housing of the left rear wheel (not illustrated), said wheel housing extending through a lateral inwardly curved opening 39 formed in the panel 34.

A corresponding axially symmetrical configuration of the seat back sheet metal panel 34 is also provided on the right-hand side (not shown in FIG. 6) of the panel 34.

In order to enable the seat back, i.e., the seat back panel 34, to be locked to the vehicle body when the seat back is in its normal upright position, a locking assembly is provided which is designated in FIG. 6 by the numeral 40. The operation of the locking device will be apparent from FIGS. 7 to 9, and the individual components of the locking device are also illustrated in these figures. Numeral 10a designates a unitary injection molded locking housing, similar to that of the embodiment illustrated in FIGS. 1 to 5. Other components of the locking assembly are also similar to those used in the embodiment according to FIGS. 1 to 5 and therefore need not be described again. To elucidate the likeness in design and operation of the two embodiments, the numerals assigned to equivalent parts are the same as those of the embodiment according to FIGS. 1 to 5, except for the letter "a" that has been added to the numerals of the embodiment according to FIGS. 7 to 9. Therefore, the following description is confined to the areas in which the embodiment according to FIGS. 7 to 9 differs from that according to FIGS. 1 to 5.

As is apparent especially from FIG. 9, a mounting plate 41 is formed integrally on the housing 10a and extends in perpendicular, or substantially perpendicular relationship thereto. The mounting plate 41 has four through holes 42 for mounting the housing 10a, by means of threaded bolts or the like, to the seat back 34 of the rear seat assembly in a position illustrated in FIG. 6. The mounting plate 41 is also provided with an opening 43 which is oblong, as apparent from FIG. 7, and which is in spatial communication with the guide channel 17a. Said opening 43 is provided so that a locking element 44 can be inserted into the housing 10a. The locking element 44 is secured, in a manner not shown in the drawings, to a vehicle body component or structure, whereas the housing 10a, as mentioned above, is secured to the seat back 34 of the rear seat assembly. The arrangement according to FIGS. 7 to 9 differs from the one according to FIGS. 1 to 5 in that the locking element 44 is a U-shaped member rather than a bolt. As apparent from FIG. 9, the locking element 44 includes a pair of legs 45, 46 and, when in the locking position, cooperates with the locking housing 10a in such a manner that each leg 45, 46 will come to be positioned adjacent the respective side of the guide channel 17a and outside of the locking housing 10a. However, the web 47 of the U-shaped locking element 44 will engage, as apparent from FIGS. 8 and 9, on the one side with the resilient engagement surface 20a, and is engaged on the opposite side by the arresting element 11a.

Preferably, the locking element 11a is inserted and moved into its locking position, FIGS. 7 to 9, automatically, i.e., when the seat back 34 of the rear seat assembly is folded rearwardly into its normal upright position. In the course of this procedure, the arresting element 11a is urged upwardly against the spring bias of the bracket 12a by the locking element 44 and will subsequently automatically be moved into its arresting position (see FIGS. 7 to 9) through the spring force exerted by the bracket 12a. The unlocking operation only requires a pulling force to be exerted on the control element 13a in the direction of arrow 48. For this purpose, the control element 13a has, as apparent from FIG. 6, an actuating button 49 secured to its upper end.

The embodiments of the invention in which an exclusive property or privilege is claimed are defined as follows:

1. In an automotive vehicle having a seat back rest pivotally supported by vehicle body structure for movement to and from an upright position, a locking element carried by one of said back rest and body structure of the vehicle and a locking device carried by the other of said back rest and body structure of the vehicle, said locking device comprising a housing having a guide slot means for receiving said locking element when the seat back is moved to its upright position, a pivotal latch member carried by said housing means and which is spring biased toward a first position in which it is disposed within the guide slot means, said latch member being movable in opposition to its spring biasing force toward a second release position to enable said locking element to clear the latch member when the back rest approaches its upright position and then returned by the spring biasing force toward its first position to lock the locking element to the housing means, and a releasable means operatively associated with said latch member to enable the latter to be moved from its first position toward its second position in opposition to the spring biasing force to enable the locking element to clear the latch member and said seat back to be unlocked and moved from its upright position, the improvement being that said locking device is of a one piece molded plastic construction, that the latch member adjacent one end thereof is integral with the housing via a web hinge which functions both as a pivot for the latch member and as a spring for biasing the latch member toward its first position, the latch member at its other end is free from the housing, has an end surface for engaging the locking member and has a side surface which is disposed within the guide slot means when in its first position and defines a side surface of the guide slot means when moved to its second release position, that the releasable means includes an actuating element extending through a slot in the housing and which is integral at one end to the other end of said latch member to enable said latch member to be moved from its first position to its second release position by pulling on said actuating element whereby the locking element can be removed from or received within the guide slot means of said housing, said latch member at said one end adjacent the web hinge having a convex surface which is shaped complementary with an adjacent concave surface in said housing such that forces applied by the locking element to the latch member in a reverse unlocking direction are transmitted directly to said housing, and said housing at the end of said guide slot means having an integrally formed convex leaf spring for resiliently engaging said locking element and holding the latter against said latch member.

2. In an automotive vehicle, as defined in claim 1, and wherein said housing is secured to a metal back of said seat back rest and said locking element is carried by vehicle body structure.

* * * * *